United States Patent Office 3,655,694
Patented Apr. 11, 1972

3,655,694
NOVEL α-PYRONES
Kyu Tai Lee and Joel G. Whitney, Wilmington, Del., assignors to E. I. du Pont de Nemours and Company, Wilmington, Del.
No Drawing. Original application Mar. 4, 1968, Ser. No. 709,908. Divided and this application Feb. 11, 1971, Ser. No. 114,683
Int. Cl. C07d 7/18
U.S. Cl. 260—343.2 R         3 Claims

ABSTRACT OF THE DISCLOSURE

Certain novel α-pyrones are useful intermediates in the preparation of ethanooctahydrophenanthrene derivatives, which are effective antifertility agents. The novel pyrones are made from appropriately substituted α-tetralones by reaction with ethyl ethoxymethylenecyanoacetate in glyme in the presence of sodium ethoxide under a nitrogen atmosphere.

CROSS REFERENCE TO A RELATED APPLICATION

This is a divisional of our copending application Ser. No. 709,908, filed Mar. 4, 1968, now U.S. Pat. No. 3,565,944.

BACKGROUND OF THE INVENTION

The patent application, Ser. No. 709,908 discloses novel di- and polysubstituted derivatives of 2,4'-ethanooctahydroxyphenanthrene, which are effective postcoital antifertility agents. Those compounds can be represented by the following Formula 1

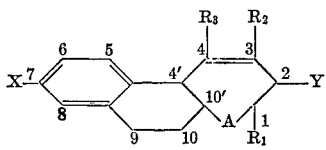

where:

A is a single or a double bond; and
$R_1$, $R_2$, $R_3$ can be the same or different and can be H or alkyl of one through six carbons; and
X is H, HO, RO where R is an alkyl of one through four carbons, or

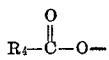

where $R_4$ is hydrogen or an alkyl of one through twelve carbons with the limitation that when X is hydrogen at least one of $R_1$, $R_2$, and $R_3$ must be alkyl of one through six carbons; and
Y is

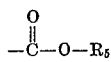

where $R_5$ is H, alkyl of one through six carbons, $Me^+$ where $Me^+$ is a non-toxic pharmaceutically acceptable salt-forming cation such as sodium, potassium, magnesium or ammonium; —$CH_2$—$OR_6$ where $R_6$ is hydrogen, an ester-forming monocarboxylic acid radical such as acetyl or propionyl, or an ester-forming dicarboxylic acid radical, preferably forming hemiesters such as hemisuccinyl, hemiglutaryl or hemiadipyl; or

wherein $R_7$ is H, —NH—$NH_2$,

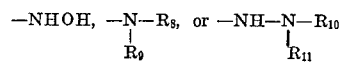

wherein $R_8$, $R_9$, $R_{10}$ and $R_{11}$ are the same or different and can be H or alkyl of 1–3 carbons; with the proviso that $R_{10}$ and $R_{11}$, when taken together with the nitrogen to which they are bonded, can form the rings of pyrrolidine, piperidine, or morpholine.

A key intermediate in the synthesis of the compounds of Formula 1 is an α-pyrone, which can be represented by the following Formula 2

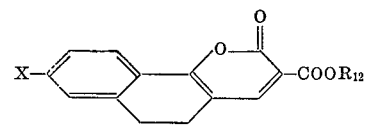

where:

$R_{12}$ is alkyl of one through four carbons; and
X is $R_{13}O$— or $R_{14}CO_2$ where $R_{13}$ is alkyl of one through four carbons and $R_{14}$ is hydrogen or alkyl of one through twelve carbons.

SUMMARY OF THE INVENTION

This invention is directed to the novel α-pyrones of the above Formula 2, and particularly to those in which X is $R_{13}O$—. These α-pyrones thus can be represented by the Formula 3, below:

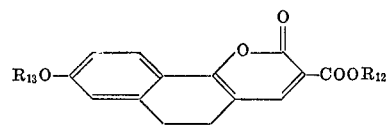

where $R_{12}$ and $R_{13}$ each independently is a $C_1$–$C_4$ alkyl.

The above compounds are prepared from appropriately substituted α-tetralones by a reaction with ethyl ethoxymethylenecyanoacetate in glyme in the presence of sodium ethoxide under a nitrogen atmosphere. The intermediate thus formed is treated with dilute aqueous hydrochloric acid to give the corresponding α-pyrone, such as 8-methoxy-5,6-dihydro-2-oxo-2H-naphtho[1,2-b]pyran-3-carboxylic acid ethyl ester.

DETAILED DESCRIPTION OF THE INVENTION

Representative α-pyrones contemplated by the present invention include the following:

8-methoxy-5,6-dihydro-2-oxo-2H-naphtho[1,2-b]pyran-3-carboxylic acid methyl ester;
8-methoxy-5,6-dihydro-2-oxo-2H-naphtho[1,2-b]pyran-3-carboxylic acid propyl ester;
8-methoxy-5,6-dihydro-2-oxo-2H-naphtho[1,2-b]pyran-3-carboxylic acid butyl ester;
8-ethoxy-5,6-dihydro-2-oxo-2H-naphtho[1,2-b]pyran-3-carboxylic acid ethyl ester;
8-ethoxy-5,6-dihydro-2-oxo-2H-naphtho[1,2-b]pyran-3-carboxylic acid butyl ester;
8-propoxy-5,6-dihydro-2-oxo-2H-naphtho[1,2-b]pyran-3-carboxylic acid methyl ester;
8-propoxy-5,6-dihydro-2-oxo-2H-naphtho[1,2-b]pyran-3-carboxylic acid ethyl ester;
8-propoxy-5,6-dihydro-2-oxo-2H-naphtho[1,2-b]pyran-3-carboxylic acid propyl ester;
8-butoxy-5,6-dihydro-2-oxo-2H-naphtho[1,2-b]pyran-3-carboxylic acid ethyl ester; and
8-butoxy-5,6-dihydro-2-oxo-2H-naphtho[1,2-b]pyran-3-carboxylic acid butyl ester.

Novel ethanooctahydrophenanthrene derivatives of Formula 1, above, can be prepared from the above α-pyrones in several ways. Thus, the α-pyrone can be heated at 150–200° C. with ethylene under pressure (2,000–3,000 atm.) in the presence of a solvent such as benzene or without solvent to give the corresponding 2,3,4,4',9,10-hexahydro - 2,4' - ethanophenanthrene-2-carboxylic acid ethyl ester. This ester is then hydrolyzed to give the corresponding 2,3,4,4',9,10 - hexahydro-2,4'-ethanophenanthrene-2-carboxylic acid.

In order to prepare the 3,4-alkyl substituted ethanophenanthrene, the above α-pyrone is heated at 150–200° C. with an appropriate monoalkyl or dialkyl ethylene under pressure (1,000–1,500 atm.) in the presence of a solvent such as benzene or without solvent to give 3,4,9,10-tetrahydro-3,4-dialkylphenanthrene-2-carboxylic acid ethyl ester. This diene is heated at 150–200° C. with ethylene under pressure (2,000–3,000 atm.) to give 2,3,4,4',9,19-hexahydro - 3,4 - dialkyl-2,4'-ethanophenanthrene-2-carboxylic acid ethyl ester. The order in which the dialkyl substituted ethylene and the ethylene are added to the pyrone may be reversed. When the dialkyl groups of ethylene are not identical or the geometry of the dialkyl substituted ethylene is either cis or trans, the resulting 3,4-dialkyl derivative may consist of several isomers. They can be separated by conventional techniques such as fractional crystallization, distillation or chromatography.

In order to prepare the 2-alkyl substituted derivative, an appropriate 2,3,4,4',9,10 - hexahydro - 2,4'-ethanophenanthrene-2-carboxylic acid ethyl ester is treated with borane (BH$_3$) in tetrahydrofuran (THF) or in ethylene glycol dimethyl ether (glyme). The resulting boron derivative is oxidized with chromic acid to give a keto-ester such as 1,2,3,4,4',9,10,10-octahydro-2,4'-ethano-1-oxophenanthrene-2-carboxylic acid ethyl ester. This keto-ester is reacted with appropriate alkyl Grignard reagent in THF to give the 1-alkyl substituted hydroxy-ester, which on treatment with p-toluenesulfonyl chloride in pyridine gives 2,3,4,4',9,10 - hexahydro-1-alkyl-2,4'-ethanophenanthrene-2-carboxylic acid ethyl ester. The appropriate keto-acid can be employed in this reaction in place of the keto-ester with equally satisfactory results.

When the corresponding 1,2,3,4,4',9,10,10'-octahydro derivatives are desired, 2,3,4,4',9,10 - hexahydro - 2,4'-ethanophenanthrene-2-carboxylic acid ethyl ester can be reduced in the presence of an hydrogenation catalyst such as platinum oxide and a solvent to give corresponding 1,2,3,4,4',9,10,10' - octahydro-2,4'-ethanophenanthrene-2-carboxylic acid ethyl ester. Solvents which can be used for this reaction include ethanol, ethylacetate and glacial acetic acid.

When the free carboxylic acid is desired, the 1,2,3,4,4', 9,10,10' - octahydro-2,4'-ethanophenanthrene-2-carboxylic acid ethyl ester is subjected to alkaline hydrolysis followed by acidification to give the free carboxylic acid.

A more convenient method of preparing the 1-alkyl-1,2,3,4,4',9,10,10'-octahydro derivative is to treat the above mentioned 1,2,3,4,4',9,10,10'-octahydro-2,4'-ethano-1-oxophenanthrene-2-carboxylic acid ethyl ester with an appropriate alkyl Wittig reagent such as alkylene triphenyl phosphine or alkylene phosphonate in THF to give 1,2,3,4,4'-9,10,10'-octahydro - 2,4'-ethanol-alkylenephenanthrene-2-carboxylic acid ethyl ester. This alkylene derivative is then reduced in the presence of a hydrogenation catalyst in a suitable solvent such as ethanol, ethyl acetate or glacial acetic acid to give corresponding 1,2,3,4,4',9,10,10' - octahydro - 2,4'-ethano-1-alkylphenanthrene-2-carboxylic acid ethyl ester.

Other 2,4' - ethanooctahydrophenanthrene derivatives are readily made from the 2-carboxylic acid esters.

In the following examples, all parts and percentages are by weight unless otherwise indicated.

EXAMPLE 1

8-methoxy-5,6-dihydro-2-oxo-2H-naphtho[1,2-b]pyran-3-carboxylic acid ethyl ester (α-pyrone)

To a mixture of sodium ethoxide prepared from 10.8 parts of sodium hydride and 31 parts of anhydrous ethanol in 300 ml. of anhydrous glyme is added dropwise 67.6 parts of ethyl ethoxymethylenecyanoacete, followed by 70.4 parts of 6-methoxy-1-tetralone dissolved in glyme. The mixture is stirred at 50° C. for 3 hours and is allowed to cool. It is slowly poured into 500 ml. of 3 N hydrochloric acid. The precipitate is collected by filtration and is suspended on 1 liter of water. The mixture is warmed on steam bath for 3 hours and allowed to cool. The solid product is collected by filtration and washed with water. It is recrystallized from ethanol-water mixture to give pure 8-methoxy - 5,6 - dihydro-2-oxo-2H-naphtho[1,2-b] pyran-3-carboxylic acid ethyl ester (α-pyrone); M.P. 141–142.5 C.

An analytical sample was prepared by recrystallizing the α-pyrone from a dimethylformamide-water mixture; M.P. 150.5–152° C.

*Analysis.*—Calcd. for $C_{17}H_{16}O_5$ (percent): C, 67.99; H, 5.37. Found (percent): C, 67.75; H, 5.48.

EXAMPLE 2

The process of Example 1 is repeated but substituting an equivalent amount of 6-ethoxy-1-tetralone for 6-methoxy-1-tetralone used in Example 1 to obtain 8-ethoxy - 5,6 - dihydro-2-oxo-2H-naphtho[1,2-b]pyran-3-carboxylic acid ethyl ester.

We claim:

1. A compound of the formula

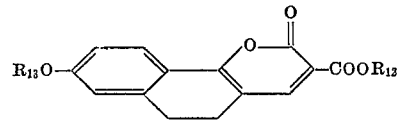

where each of $R_{12}$ and $R_{13}$ independently is a $C_1$–$C_4$ alkyl.

2. 8 - methoxy - 5,6-dihydro-2-oxo-2H-naphtho[1,2-b] pyran-3-carboxylic acid ethyl ester, the compound of claim 1 in which $R_{12}$ is ethyl and $R_{13}$ is methyl.

3. 8 - ethoxy-5,6-dihydro - 2 - oxo-2H-naphtho[1,2-b] pyran-3-carboxylic acid ethyl ester, the compound of claim 1 in which each of $R_{12}$ and $R_{13}$ is ethyl.

References Cited

UNITED STATES PATENTS 2,878,138  3/1959  Raue et al. _____ 260—343.2 X
3,427,328  2/1969  Sandermann et al. _ 260—343.2 X JOHN M. FORD, Primary Examiner U.S. Cl. X.R.

260—473 F, 520; 424—308, 317